US008751234B2

(12) United States Patent
Singh et al.

(10) Patent No.: US 8,751,234 B2
(45) Date of Patent: Jun. 10, 2014

(54) COMMUNICATION DEVICE FOR DETERMINING CONTEXTUAL INFORMATION

(75) Inventors: Jasjit Singh, Redwood City, CA (US); Suzanne Abellera, Redwood City, CA (US); Shakila Shahul Hameed, San Carlos, CA (US); Ankur Aggarwal, Redwood City, CA (US); Carol C. Wu, Palo Alto, CA (US); Paxton Ronald Cooper, Mountain View, CA (US); Robert Felice Mori, Palo Alto, CA (US)

(73) Assignee: BlackBerry Limited, Waterloo (CA)

( * ) Notice: Subject to any disclaimer, the term of this patent is extended or adjusted under 35 U.S.C. 154(b) by 396 days.

(21) Appl. No.: 13/095,416

(22) Filed: Apr. 27, 2011

(65) Prior Publication Data

US 2012/0278080 A1 Nov. 1, 2012

(51) Int. Cl.
G10L 15/00 (2013.01)
(52) U.S. Cl.
USPC .................. 704/257; 704/9; 704/7; 701/465
(58) Field of Classification Search
USPC ............ 704/1–10, 251, 255, 257, 270, 270.1; 707/723, 729; 719/313; 709/238; 379/88.12; 701/465
See application file for complete search history.

(56) References Cited

U.S. PATENT DOCUMENTS

| | | | |
|---|---|---|---|
| 7,849,213 B1 * | 12/2010 | Borghetti | 709/238 |
| 7,890,957 B2 * | 2/2011 | Campbell | 719/313 |
| 8,077,837 B1 * | 12/2011 | Wright et al. | 379/88.12 |
| 8,103,665 B2 * | 1/2012 | Abbott et al. | 707/729 |
| 8,457,887 B2 * | 6/2013 | Gupta et al. | 701/465 |
| 2006/0010379 A1 | 1/2006 | Kashi | |
| 2006/0173859 A1 | 8/2006 | Kim | |
| 2006/0235872 A1 | 10/2006 | Kline | |
| 2007/0073810 A1 | 3/2007 | Adams | |
| 2007/0150513 A1 | 6/2007 | Vanden Heuvel | |
| 2007/0266008 A1 | 11/2007 | Bae | |
| 2008/0016142 A1 | 1/2008 | Schneider | |
| 2010/0228753 A1 | 9/2010 | Jain | |
| 2011/0010639 A1 | 1/2011 | Maguire | |
| 2012/0239643 A1 * | 9/2012 | Ekstrand et al. | 707/723 |

FOREIGN PATENT DOCUMENTS

| | | |
|---|---|---|
| EP | 1424863 | 6/2004 |
| WO | 0051042 A2 | 8/2000 |
| WO | 2008070605 A1 | 6/2008 |

OTHER PUBLICATIONS

Extended European Search Report dated Oct. 7, 2011. In corresponding application No. 11163883.9.

(Continued)

*Primary Examiner* — Huyen X. Vo
(74) *Attorney, Agent, or Firm* — Novak Druce Connolly Bove + Quigg LLP

(57) ABSTRACT

A method and communication device for determining contextual information is provided. Textual information is received from at least one of an input device and a communication interface at the communication device. The textual information is processed to automatically extract contextual data embedded in the textual information in response to the receiving. Supplementary contextual data is automatically retrieved based on the contextual data from a remote data source via the communication interface in response to the processing. The supplementary contextual data is automatically rendered at the display device in association with the contextual data in response to receiving the supplementary contextual data.

20 Claims, 15 Drawing Sheets

(56) References Cited

OTHER PUBLICATIONS

Cornell, Paul; "Developing Smart Tag DLLs," Apr. 2001; Microsoft Corporation; retrieved from http://msdn.microsoft.com/en-us/library/aa140238(office.10).aspx on Dec. 20, 2010.

Right Click Search Options in Safari.—MacRumors Forums; retrieved from http://forums.macrumors.com/showthread.php?t_883388 on Dec. 20, 2010.

Microsoft Internet Explorer 8; retrieved from http://malektips.com/internet-explorer-8-stock-quote-accelerator.html on Dec. 20, 2010.

Nardi, et al.; Collaborative, programmable intelligent agents; miramontes interactive; retrieved from http://www.miramontes.com/writing/add-cacm/ on Apr. 26, 2011.

\* cited by examiner

COMMUNICATION DEVICE FOR DETERMINING CONTEXTUAL INFORMATION

FIELD

The specification relates generally to communication devices, and specifically to a communication device for determining contextual information.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
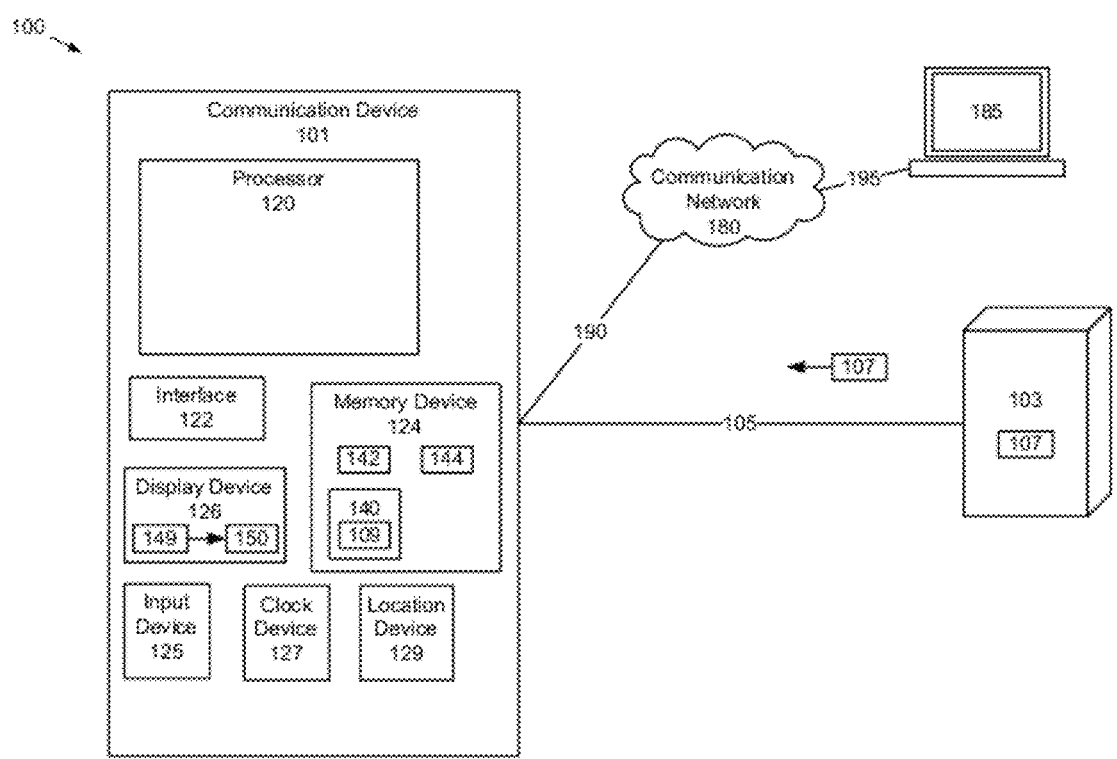
FIG. 1 depicts a system for determining contextual information at a communication device, according to non-limiting implementations.

An aspect of the specification provides a method for determining contextual information at a communication device comprising a processing unit interconnected with a memory device, a communication interface and a display device, the method comprising: receiving textual information from at least one of an input device and the communication interface; processing the textual information to automatically extract contextual data embedded in the textual information in response to the receiving; automatically retrieving supplementary contextual data based on the contextual data from a remote data source via the communication interface in response to the processing; and, automatically rendering the supplementary contextual data at the display device in association with the contextual data in response to receiving the supplementary contextual data.

Receiving textual information can comprise at least one of: receiving a message; receiving an e-mail; receiving calendar data; and receiving input from the input device.

Processing the textual information to automatically extract the contextual data can comprise at least one of: comparing strings in the textual information to contextual data formats; and comparing the textual information to contextual data keywords.

Automatically retrieving the supplementary contextual data based on the contextual data from the remote data source can comprise requesting the supplementary contextual data from a web service by transmitting at least a portion of the contextual data in a request to the web service.

Automatically rendering the supplementary contextual data at the display device in association with the contextual data in response to receiving the supplementary contextual data can comprise rendering the supplementary contextual data at least one of adjacent and proximal to the contextual data.

The method can further comprise determining a time for automatically rendering the supplementary contextual data at the display device in association with the contextual data using the supplementary context data. Automatically rendering the supplementary contextual data at the display device in association with the contextual data in response to receiving the supplementary contextual data can occurs at the time for automatically rendering the supplementary contextual data at the display device in association with the contextual data using the supplementary context data. Textual information can comprise calendar data associated with a calendar event and the supplementary context data and the context data can be rendered within a reminder of the calendar event. The method can further comprise changing at least one user experience application within a given time period prior to the time, the change can be based on at least one of the supplementary context data and the contextual data.

The method of claim can further comprise dynamically repeating the retrieving and the rendering at least one of periodically and when a change in location of the communication device is determined. The supplementary contextual information can be updated based on the location when each of the retrieving and the rendering is repeated.

Another aspect of the specification provides a communication device for determining contextual information, comprising: a processing unit interconnected with a memory device, a communication interface and a display device, the processing unit enabled to: receive textual information from at least one of an input device and the communication interface; process the textual information to automatically extract contextual data embedded in the textual information in response to the receiving; automatically retrieve supplementary contextual data based on the contextual data from a remote data source via the communication interface in response to the processing; and, automatically render the supplementary contextual data at the display device in association with the contextual data in response to receiving the supplementary contextual data.

The processing unit can be further enabled to receive the textual information by at least one of: receiving a message; receiving an e-mail; receiving calendar data; and receiving input from the input device.

The processing unit can be further enabled to process the textual information to automatically extract the contextual data by at least one of: comparing strings in the textual information to contextual data formats; and comparing the textual information to contextual data keywords.

The processing unit can be further enabled to automatically retrieve the supplementary contextual data based on the contextual data from the remote data source by requesting the supplementary contextual data from a web service by transmitting at least a portion of the contextual data in a request to the web service.

The processing unit can be further enabled to automatically render the supplementary contextual data at the display device in association with the contextual data in response to receiving the supplementary contextual data by rendering the supplementary contextual data at least one of adjacent and proximal to the contextual data.

The processing unit can be further enabled to determine a time for automatically rendering the supplementary contextual data at the display device in association with the contextual data using the supplementary context data.

The processing unit can be further enabled to automatically render the supplementary contextual data at the display device in association with the contextual data, in response to receiving the supplementary contextual data, at the time. Textual information can comprise calendar data associated with a calendar event and the supplementary context data and the context data can be rendered within a reminder of the calendar event. The processing unit can be further enabled to change at least one user experience application within a given time period prior to the time, the change can be based on at least one of the supplementary context data and the contextual data.

The processing unit can be further enabled to dynamically repeat the retrieve step and the render step at least one of periodically and when a change in location of the communication device is determined. The supplementary contextual information can be updated based on the location when each of retrieve step and the render step is repeated.

Yet a further aspect of the specification provides a non-transitory computer program product, comprising a computer usable medium having a computer readable program code adapted to be executed to implement a method for determining contextual information at a communication device comprising a processing unit interconnected with a memory device, a communication interface and a display device, the method comprising: receiving textual information from at least one of an input device and the communication interface; processing the textual information to automatically extract contextual data embedded in the textual information in response to the receiving; automatically retrieving supplementary contextual data based on the contextual data from a remote data source via the communication interface in response to the processing; and, automatically rendering the supplementary contextual data at the display device in association with the contextual data in response to receiving the supplementary contextual data.

Yet a further aspect of the specification provides a method for determining contextual information at a communication device comprising a processing unit interconnected with a memory device, a communication interface and a display device, the method comprising: receiving textual information from at least one of an input device and the communication interface; processing the textual information to automatically extract contextual data embedded in the textual information in response to the receiving; automatically retrieving supplementary contextual data based on the contextual data from a remote data source via the communication interface in response to the processing by requesting the supplementary contextual data from a web service, the requesting comprising transmitting at least a portion of the contextual data in a request to the web service; automatically rendering the supplementary contextual data at the display device in association with the contextual data in response to receiving the supplementary contextual data; and, dynamically repeating the retrieving and the rendering at least one of periodically and when a change in location of the communication device is determined.

FIG. 1 depicts a system 100 for determining contextual information at a communication device 101, according to non-limiting implementations. In some implementations communication device 101 (also be referred to hereafter as device 101) is in communication with a remote data source 103 via a link 105, supplementary contextual data 107 received from remote data source 103 at device 101 via link 105, based on contextual data 109 as will be explained below. Device 101 comprises a processing unit 120 interconnected with a communication interface 122, a memory device 124, an input device 125, and a display device 126, for example via a computing bus (not depicted). In some implementations device 101 can also comprise a clock device 127 and/or a location device 129.

Memory device 124 (also referred to hereafter as memory 124) stores textual data 140. Memory 124 further stores an application 142 for causing textual data 140 to be processed to extract contextual data 109 embedded therein, cause supplementary contextual data 107 to be retrieved from remote data source 103, and cause supplementary contextual data 107 to be rendered in association with contextual data 109. In some implementations, device 101 can further comprise comprises applications enabled to receive and/or cause textual information 140 to be processed, for example an application 144, such as a word processor, a calendar application and/or an e-mail application. It is appreciated that application 142 can communicate with and/or be integrated with application 144, to cause supplementary contextual data 107 to be rendered at display device 126 in association with contextual data 109.

In general, device 101 comprises any suitable electronic device for receiving and processing textual data 140, and processing application 142, contextual data 109 and supplementary contextual data 107, including but not limited to any suitable combination of communication devices, computing devices, desktop computing devices, laptop computing devices, portable computing devices, tablet computing devices, mobile electronic devices, PDAs (personal digital assistants), cellphones, smartphones and the like. Other suitable electronic devices are within the scope of present implementations.

Remote data source 103 can be based on any well-known server environment including a module that houses one or more central processing units, volatile memory (e.g. random access memory), persistent memory (e.g. hard disk devices) and network interfaces to allow remote data source 103 to communicate over link 105. For example, remote data source 103 can be a ProLiant® Server from Hewlett-Packard Company, 3000 Hanover Street Palo Alto, Calif. 94304-1185 USA having a plurality of central processing units and having several gigabytes of random access memory. However, it is to be emphasized that this particular server is merely a non-limiting example, and a vast array of other types of computing environments for remote data source 103 is contemplated. Furthermore, it is contemplated that remote data source 103 may be implemented as a plurality of interconnected servers, in a so-called server farm, which are mirrored or otherwise configured for load balancing or failover or high availability or any or all of those. In some non-limiting implementations, remote data source 103 comprises a web service.

It is yet further contemplated that system 100 can comprise a plurality of remote data sources (not depicted) similar to remote data source 103, each remote data source in the plurality of remote data sources providing supplementary context data for different applications based on context data 109. In some implementations, system 100 can comprise a proxy server intermediate device 101 and remote data source 103.

Link 105 comprises any suitable link between device 101 and remote data source 103, including any suitable combination of wired and/or wireless links, wired and/or wireless devices and/or wired and/or wireless networks, including but not limited to any suitable combination of including but not limited to wired link, USB (universal serial bus) cables, serial cables, wireless links, cell-phone links, wireless data, Bluetooth links, NFC (near field communication) links, WiFi links, WiMax links, packet based links, the Internet, analog networks, the PSTN (public switched telephone network), access points, and the like, and/or a combination. Other suitable communication link and/or devices and/or networks are within the scope of present implementations.

With regard to device 101, processing unit 120 (also referred to hereafter as processor 120) comprises any suitable processor, or combination of processors, including but not limited to a microprocessor, a central processing unit (CPU) and the like. Other suitable processing units are within the scope of present implementations. It is appreciated that processing unit 120 is enabled to process supplementary contextual data 107, contextual data 109, textual data 140, and application 142. Further processor 120 can be enabled to execute different programming instructions that can be responsive to the input received via input devices and/or upon receipt of supplementary contextual data 107.

Communication interface 122 comprises any suitable communication interface, or combination of communication interfaces. In particular communication interface 122 is enabled to communicate with remote data source 103 via link 105 using any suitable wired and/or wireless protocol. Accordingly, communication interface 122 (which will also be referred to as interface 122 hereafter) is enabled to communicate according to any suitable protocol which is compatible with link 105, including but not limited to wired protocols, USB (universal serial bus) protocols, serial cable protocols, wireless protocols, cell-phone protocols, wireless data protocols, Bluetooth protocols, NFC (near field communication) protocols, packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations.

Input device 125 is generally enabled to receive input data, and can comprise any suitable combination of input devices, including but not limited to a keyboard, a keypad, a pointing device, a mouse, a track wheel, a trackball, a touchpad, a trackpad, a touch screen and the like. Other suitable input devices are within the scope of present implementations.

Memory device 124 can comprise any suitable memory device, including but not limited to any suitable one of, or combination of, volatile memory, non-volatile memory, random access memory (RAM), read-only memory (ROM), Erase Electronic Programmable Read Only Memory (EEPROM), Flash Memory hard drive, optical drive, flash memory, magnetic computer storage devices (e.g. hard disks, floppy disks, and magnetic tape), optical discs, removable memory, and the like. Other suitable memory devices are within the scope of present implementations. In particular, memory device 124 is enabled to store supplementary contextual data 107, contextual data 109, textual data 140, and application 142.

Display device 126 comprises circuitry 149 for generating renderings of data, for example a rendering 150 of at least one of supplementary contextual data 107, contextual data 109, textual data 140, and application 142, as will be described below. Display device 126 can include any suitable one of or combination of CRT (cathode ray tube) and/or flat panel displays (e.g. LCD (liquid crystal display), plasma, OLED (organic light emitting diode), capacitive or resistive touch-screens, and the like). Circuitry 149 can include any suitable combination of circuitry for controlling the CRT and/or flat panel displays etc., including but not limited to display buffers, transistors, electron beam controllers, LCD cells, plasmas cells, phosphors etc. In particular, display device 126 and circuitry 149 can be controlled by processing unit 120 to generate rendering 150.

In particular, attention is directed to FIG. 2 which depicts non-limiting implementations of display device 126 and circuitry 149, in communication with processing unit 120 and a memory cache 227 (hereinafter cache 227). In some implementations, memory device 124 can comprise cache 227, while in other implementations cache 227 can comprise a separate memory device. Furthermore, processing unit 120 is in communication with cache 227 and further enabled to control circuitry 149. In particular, processing unit is enabled to control an area 230 of circuitry 149 to provide rendering 150. Data 240 is stored in cache 227, data 240 comprising data for controlling area 230 to provide rendering 150; when rendering 150 is to be provided at display 126, data 240 is transferred to display 126 to control circuitry 230.

Figure 2:
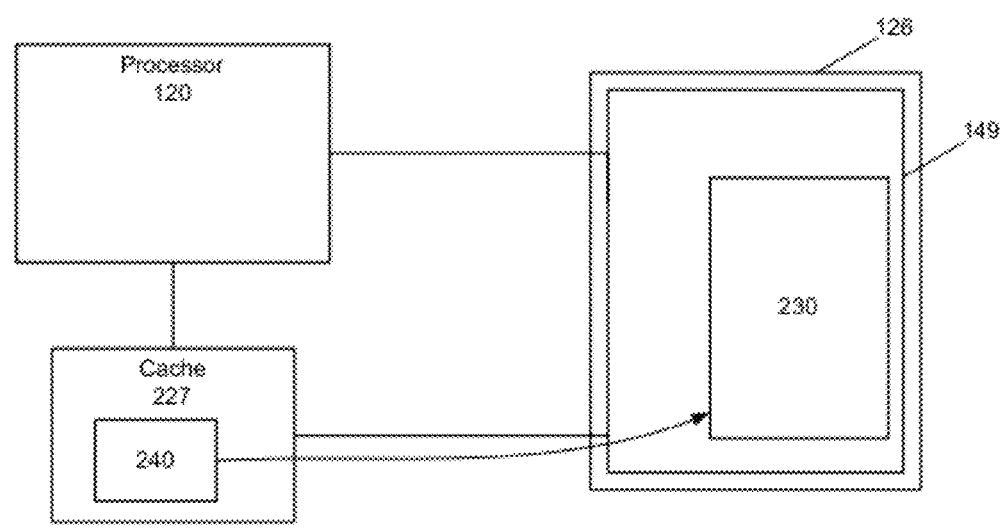
FIG. 2 depicts components of the communication device of FIG. 1, according to non-limiting implementations.

In implementations depicted in FIG. 2, it is appreciated that circuitry 149 and area 230 comprises, for example, transistors in a flat panel display; however, in other implementations, circuitry 149 can comprise a combination of an electron gun in a CRT, and area 230 can comprise phosphors in a CRT.

In some implementations device 101 further comprises clock device 127, comprising any suitable electronic and/or digital clock device. It is appreciated that processor 120 is interconnected with clock device 127 (e.g. via a computer bus, not depicted) such that processor 120 can retrieve times and/or dates from clock device 127 and thereby determine when a given time period has passed.

In some implementations device 101 further comprises location device 129, comprising any suitable device for determining a location of device 101. For example, location device 129 can comprise a GPS (Global Positioning System) device, a triangulation device and the like. It is appreciated that processor 120 is interconnected with clock device 120 (e.g. via a computer bus, not depicted) such that processor 120 can retrieve a present location from location device 129 and thereby determine the present location.

In some implementations, device 101 can further comprise any suitable combination of other hardware and/or software components, including but not limited to, an accelerometer, a light sensor, a compass sensor, an address book, a messaging application, a media application a calendar application, and the like.

In some implementations, system 100 can further comprise a network 180 and a remote communications device 185 (also referred to hereafter as device 185), each of device 101 and device 185 connected to network 180 via a respective links 190, 195, which can each be similar to link 105. Indeed, network 180 can be any suitable wired or wireless network, and device 185 can be any suitable communications device 185, which can be similar or different to device 101. Further, link 105 can comprise at least a portion of link 190 and/or network 180.

Figure 3:
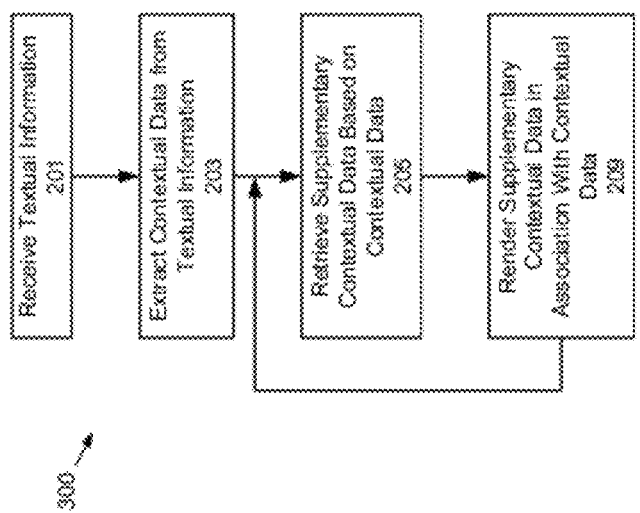
FIG. 3 depicts a method for determining contextual information at a communication device, according to non-limiting implementations.

Attention is now directed to FIG. 3 which depicts a flowchart of a method 300 for determining contextual information at a communication device. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in It is appreciated that method 300 is implemented in system 100 by processing unit 120 of device 101.

Figure 4:
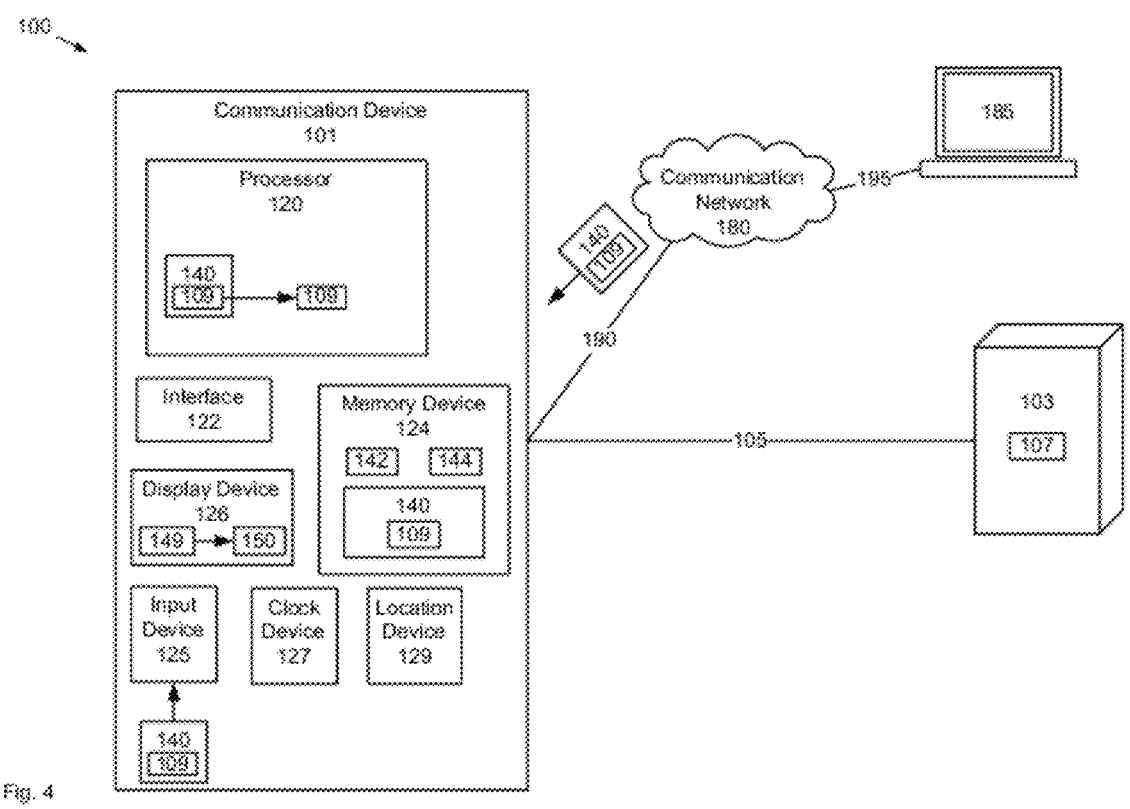
FIGS. 4 and 5 depict systems for determining contextual information at a communication device, according to non-limiting implementations.

At block 201, textual information 140 is received from at least one of input device 125 and communication interface 122. For example, as depicted in FIG. 4, textual information 140 can be received at input device 125 within application 144 as part of a document and/or e-mail and/or calendar data and the like, to be stored in memory 124 and optionally transmitted to a remote communication device (not depicted). Alternatively, as also depicted in FIG. 4, textual information 140 can be received via interface 122 as an e-mail, an e-mail attachment, a calendar invitation, and the like, from remote communication device 185 via network 180 and links 190, 195. It is appreciated that FIG. 4 is substantially similar to FIG. 1, with like elements having like numbers. It is further appreciated that contextual data 109 is embedded in textual information 140. Various implementations of textual information 140 and contextual data 109 are provided below, however it is appreciated that receiving textual information 140 can comprise at least one of: receiving a message; receiving an e-mail; receiving calendar data; and receiving input from input device 125.

Returning to FIG. 3, at block 203, processing unit 120 processes textual information 140 to automatically extract contextual data 109 embedded in textual information 140. It is appreciated that processing unit 120 processes textual information 140 in response to receiving textual information 140. However, in some implementations, there can be delay between receiving and processing textual information 140: for example, textual information 140 can be received at device 101 as an e-mail from device 185, processing textual information 140 can be delayed until application 144 is processed to cause the e-mail to be opened and displayed.

Extraction of contextual data 109 from textual information 140 by processing unit 120 is depicted in FIG. 4. In some implementations, extracting contextual data 109 can comprise at least one of: comparing strings in textual information 140 to contextual data formats; and comparing textual information 140 to contextual data keywords. For example, a list and/or database (not depicted) and the like of contextual data formats and/or contextual data keywords.

For example, in some implementations textual information 140 can comprise an e-mail containing a flight number, such as "AC161". A list and/or database and the like of contextual data formats can comprise: "Flight Numbers: XX123", indicating that flight numbers have a format of letter-letter-number-number-number. Hence, application 142 causes processing unit 120 to process textual information 140 can determined that the embedded data "AC261" conforms to the format "XX123", and hence "AC261" is identified as contextual data 109, which comprises a flight number. Any suitable format can be stored, such as formats indicative of addresses, stock ticker symbols and the like. Indeed, any suitable format for identifying contextual data 109 is within the scope of present implementations. Further, the formats list and/or database can be updated and/or changed in any suitable manner using any suitable method.

Similarly, in some implementations a list and/or database and the like of contextual data keywords can comprise: "Air Canada Flight Numbers: AC", indicating that flight numbers for Air Canada™ contain the key word AC, which can be case sensitive. Hence, application 142 causes processing unit 120 to process textual information 140 can determined that the embedded data "AC261" comprises the keyword AC, and hence "AC261" is identified as contextual data 109, which comprises a flight number. Any suitable keyword can be stored, such as keywords indicative of addresses, stock ticker symbols and the like. Indeed, any suitable keyword for identifying contextual data 109 is within the scope of present implementations. Further, the keyword list and/or database can be updated and/or changed in any suitable manner using any suitable method.

Furthermore, any suitable method of identifying contextual data 109 embedded in textual information 140 is within the scope of present implementations.

It is appreciated that contextual data 109 can also classified based on at least one of classification data in textual information 140 and classification data stored in the list and/or database. For the above example regarding a flight number "AC261", in some implementations, processing unit 120 can be enabled to search textual information 140 for classification data. For example, textual data can comprise a sentence: "Hi Bob, my flight is arriving at 8 pm, flight number AC261". In these implementations, processing unit 120 can be enabled to determine that "AC261" is a flight number by determining that the classification data "flight number" precedes "AC261". Alternatively, as "AC261" can be identified as contextual data 109 from the list and/or database, and as the list and/or database identifies contextual data 109 from a format and/or a keyword that is associated with the phrase "flight number" (e.g. "Flight Numbers: XX123" and/or "Air Canada Flight Numbers: AC"), contextual data 109 can be classified as a flight number. It is appreciated that any other suitable classification of contextual data 109 is within the scope of present implementations.

In further implementations, keyword identification can extend beyond simple pattern matching. For example, a probabilistic model can also be used to determine when the textual information 140 corresponds to a relevant context. For example, if textual information 140 contains a keyword such as "AC261", normally associated with a flight number, but is contained within the context of a message such as: "From deals@coffeeshop.com—to obtain your free coffee, enter coupon code: AC261", then "AC261" can be determined not to be a flight number keyword. Furthermore, in these implementations, the determination can be expressed as a level of confidence in cases where ambiguity is present.

Returning to FIG. 3, at block 205, supplementary contextual data 107 is automatically retrieved from remote data source 103 based on contextual data 109. For example, once contextual data 109 has been extracted from textual information 140, processing unit 120 automatically causes supplementary contextual data 107 to be retrieved from remote data source 103. In general, at least a portion 509 of contextual data 109 can be transmitted to remote data source 103 in a request 511 via link 105, as depicted in FIG. 5, substantially similar to FIG. 1, with like elements having like numbers.

Figure 5:
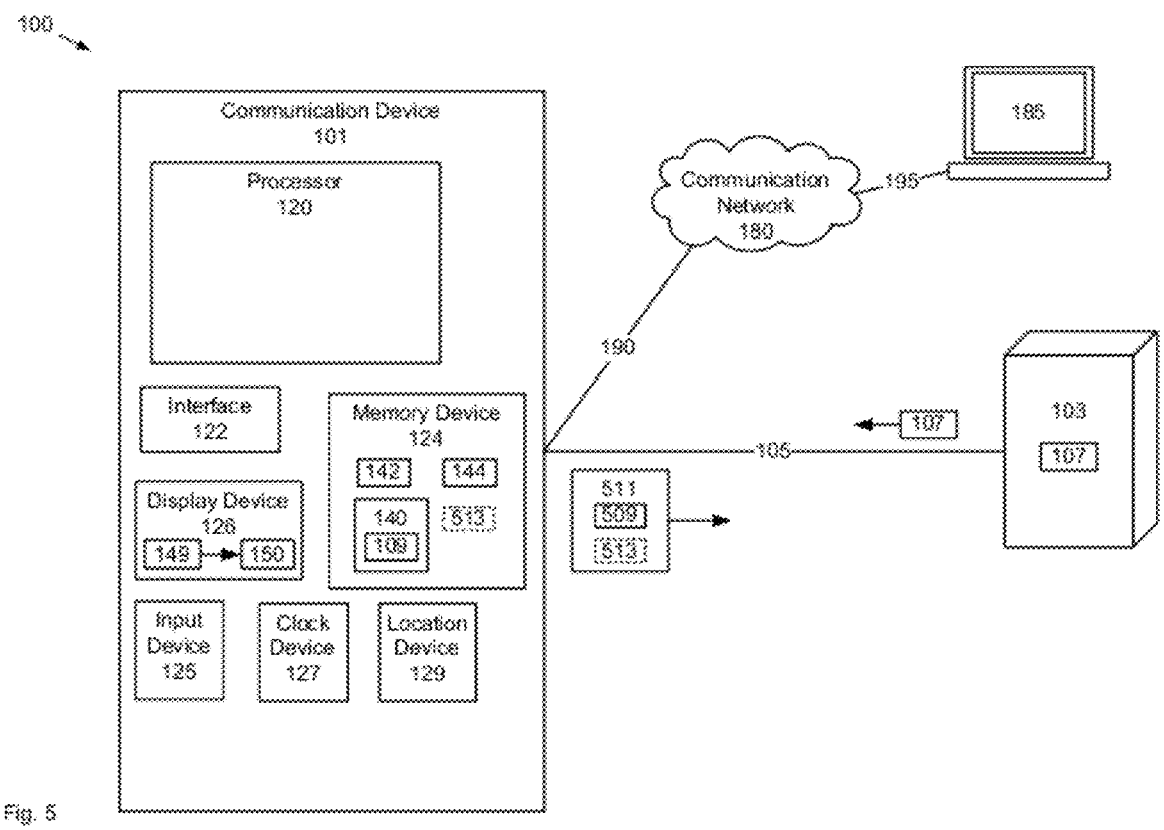

Remote data source 103 receives request 511 and identifies supplementary contextual data 107 from portion 509 and transmits supplemental contextual data 107 to device 101 via link 105, as also depicted in FIG. 5.

In some implementations, device 101 can include the classification data in request 511 such that remote data source can identify a category of contextual data 109 to further identify supplementary contextual data 107.

In further implementations where remote data source 103 comprises a plurality of remote data sources, each of the plurality of remote data sources storing different types of supplementary contextual data, device 101 can process the classification data to determine which of the plurality of remote data sources is to receive request 511, and address request 511 accordingly. For example, when contextual data 109 is classified as a flight number, request 511 can be transmitted to a suitable flight server; similarly, when contextual data 109 is classified as a stock ticker symbol, request 511 can be transmitted to a suitable stock and/or financial news server.

Alternatively, rather than classify contextual data 109 at device 101 and/or transmit request 511 to remote data source 103 directly, device 101 can transmit request 511 to a proxy server intermediate device 101 and remote data source 103 (and/or a plurality of remote data sources), and the proxy server can at least one of classify contextual data 109 and direct request 511 accordingly.

In yet further implementations, remote data source 103 can be enabled to classify contextual data 109.

In yet further implementations, request 511 can optionally comprise an indication 513 of the type of supplementary context data that is being requested from remote data source 103. For example, when a flight number is being transmitted to remote data source in a request, indication 513 can indicate that at least one of flight status, destination weather forecast and/or current weather conditions, and traffic conditions for travelling to the airport where the associated flight originates is being requested.

Indeed, indication 513 can also be stored at memory 124, as depicted in FIG. 5, and provisioned prior to transmitting request 511, as described below with reference to FIG. 6.

In yet further implementations, request 511 can further comprise a current location of device 101. For example, a current location can be determined via location device 129. In some of these implementations, the location of device 101 can also be used by remote data source 103 to determine supplementary contextual data 109 (for example a driving time from a current location to a location associated with contextual data 109).

It is yet further appreciated that remote data source 103 can comprise a web service, and hence block 205 can comprise requesting supplementary contextual data 107 from a web service by transmitting at least a portion 509 of contextual data 109 in request 511 to the web service. The web service can comprise any suitable web service for providing supplementary contextual data 107.

Returning to FIG. 3, at block 209, processing unit 120 automatically causes supplementary contextual data 107 to be rendered at display device 126 in association with contextual data 109 in response to receiving supplementary contextual data 109. Non-limiting examples of rendering supplementary contextual data 107 in association with contextual data 109 are provided below.

In some implementations, method 300 dynamically updates supplementary contextual data 109 by repeating blocks 205 and 209, for example periodically and/or when a location of device 101 changes. Hence, if changes occur to supplementary contextual data 109, either due to changes in supplementary contextual data 109 and/or due to changes in location, than those changes are retrieved at block 205 and rendered at block 209.

Figure 6:
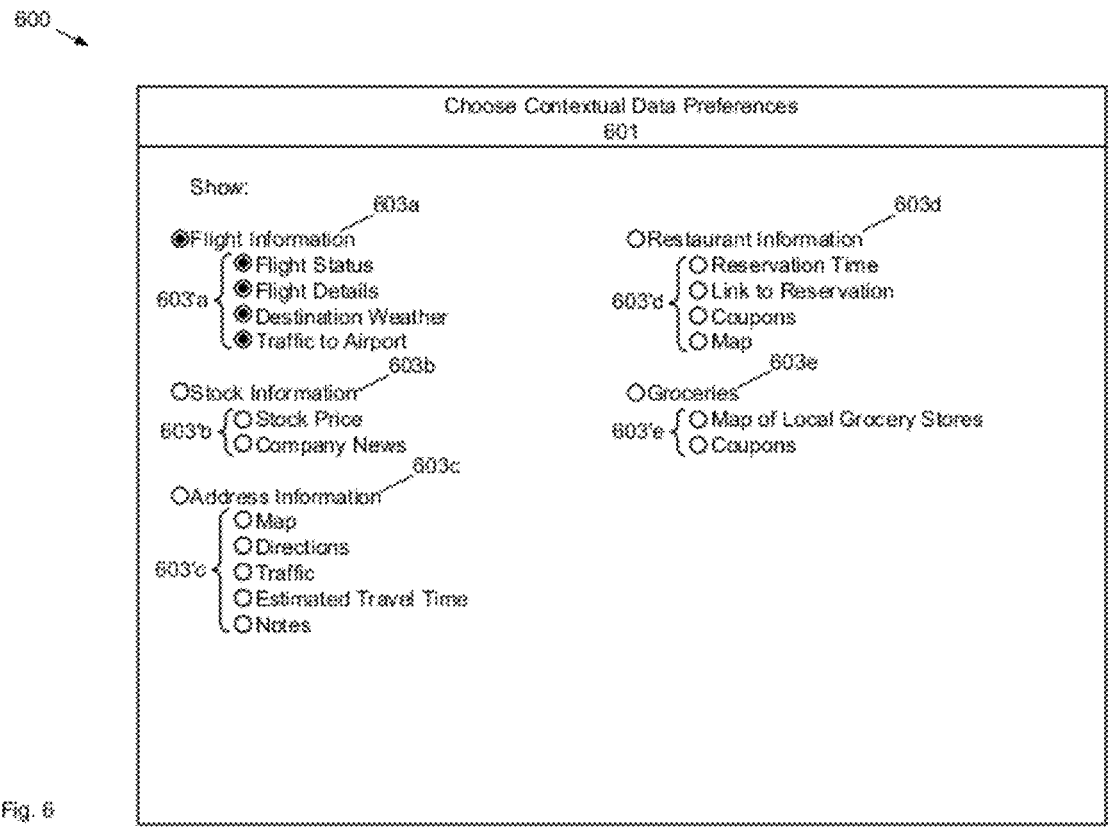
FIG. 6 depicts a Graphic User Interface (GUI) for selecting options for determining contextual information at a communication device, according to non-limiting implementations.

Attention is next directed to FIG. 6, which depicts a GUI 600 (graphic user interface) for provisioning retrieval and rendering of supplementary contextual data 107. GUI 600 can be at least one of rendered at display device 126 within representation 150 and rendered at display device 126 when representation 150 comprises a representation of at least of a portion of application 142 and/or application 144. In any event, GUI 600 comprises a header 601 indicating that GUI 600 is for provisioning contextual data preferences. GUI 600 further comprises selectable options 603a, 603b, 603c, 603d and 603e (referred to collectively as options 603 and generically as an option 603; this convention will be used hereafter with regard to all reference numbers), each selectable option for indicating which classifications of supplementary contextual data 107 is to be retrieved and rendered.

In some implementations, as depicted, GUI 600 can further comprise selectable sub-options 603'a, 603'b, 603'c, 603'd, 603'e associated each respective selectable option 603. Each selectable option 603 can be associated with any suitable number of selectable sub-options 603'. For example, selectable option 603a is associated with four selectable sub-options 603', while selectable option 603b is associated with two selectable sub-options 603'.

In any event, each selectable option 603 is representative of a respective contextual data classification, while each selectable sub-option 603' is representative of data that can be used in indication 513. Indeed, indication 513 can be generated from data representative of which options 603 and 603' are selected.

It is appreciated, however, that selectable sub-options 603' are optional and that in the absence of selectable sub-options 603', the type and/or classification of supplementary contextual data 107 that is returned to device 101 can be configured by a system administrator of system 100 and/or provisioned via factory setting at application 142.

It is further appreciated that each selectable option 603 and selectable sub-option 603' can be selected via an adjacent radio button. For example, in FIG. 6, selectable option 603a is selected, as is each of selectable sub-options 603'a. None of the other selectable options 603 and selectable sub-options 603' are selected however. It is further appreciated that, in some implementations, each selectable sub-option 603' is available for selection only when the associated selectable option 603 is selectable. For example, as selectable option 603b is not selected, selectable sub-options 603'b are not available for selection; as depicted selectable sub-options 603'b are nonetheless rendered, though in other implementations, selectable sub-options 603'b are not rendered until selectable option 603b is selected.

It is yet further appreciated that the radio buttons are not to be considered unduly limiting and that any method for selecting selectable options 603 and selectable sub-options 603'b are within the scope of present implementations. For example, checkboxes, pull-down menus and the like can be used in place of radio buttons.

Figure 7:
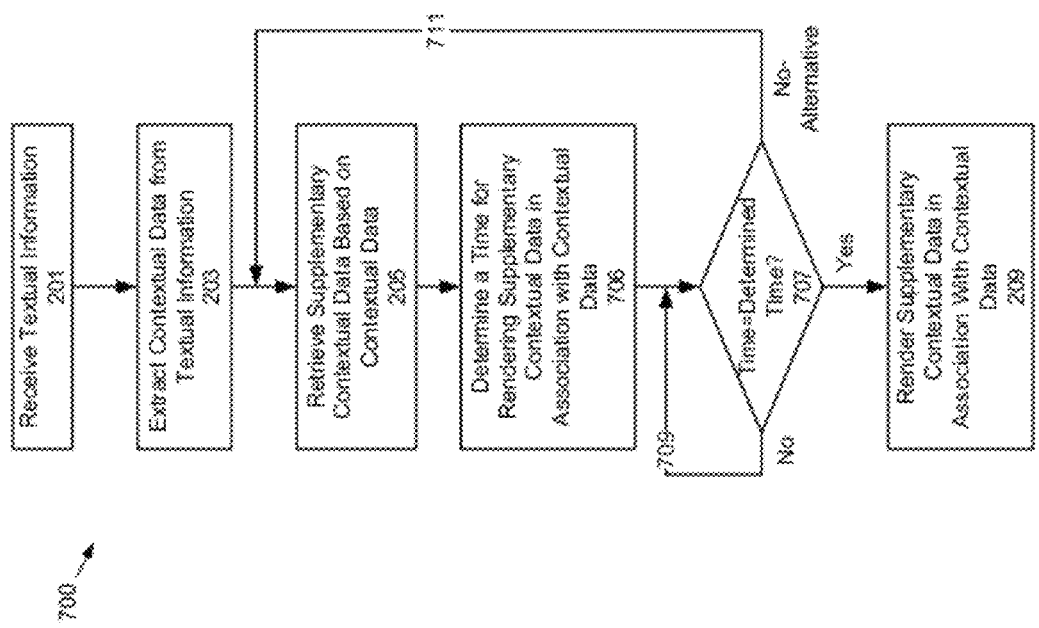
FIG. 7 depicts a method for determining contextual information at a communication device, according to non-limiting implementations.

Attention is now directed to FIG. 7 which depicts a flowchart of an alternative method 700 for determining contextual information at a communication device. Method 700 is substantially similar to method 300, with like elements having like numbers, however method 700 further comprises a block 706 determining a time for automatically rendering supplementary contextual data 107 at display device 126 in association with contextual data 109 using supplementary context data 109. For example, memory 124 can store an initial time for providing a reminder of a calendar event, such as a flight as indicated by a flight number in calendar event data (e.g. "AC261"). The initial time for providing the reminder can be three hours prior to the flight: e.g. if a flight is at 6 pm, then the reminder can be provided at 3 pm. However, when supplementary context data 109 indicates that the flight is delayed (e.g. flight status is provided in supplementary context data 109) the time for providing the reminder can be changed/determined at block 706. For example, when the flight is delayed by an hour, as indicated in supplementary contextual data 107, the reminder time can be changed to 4 pm. Furthermore, in these implementations, a notification of the change can be made earlier (for example 2 hours earlier and/or whenever the change becomes known) so a user can have some time to either re-plan their journey or take the extra time into consideration.

The reminder time can also be changed when traffic data returned in supplementary contextual data 107 indicates that a time to get to the airport originating the flight has changed. For example, if the reminder time of 3 pm was originally set assuming a travel time of 30 minutes from a current destination, and the travel time has changed to 45 minutes as indicated in supplementary contextual data 107, then the reminder time can be changed to 15 minutes earlier to allow for the longer travel time.

At block 707, the current time is compared to the time determined at block 706, and when the current time is approximately equal to the current time (e.g. plus or minus a predetermined margin of error), block 209 is executed such that automatic rendering of supplementary contextual data 107 at display device 126 in association with contextual data 109 occurs at the determined time. Otherwise block 707 repeats as indicated by arrow 709.

Alternatively, as indicated by arrow 711, method 700 can cause 700 to be dynamic by repeating blocks 205 and 706 at least one of periodically and when a location of device 101 has changed. For example, as flight status can change over time and/or a location of device 101 can change, supplementary context data 109 can be retrieved again at block 205, as described above to determine if supplementary context data 109 has changed. If so, the time for rendering supplementary contextual data 107 in association with contextual data 109 is re-determined at block 706. Referring to the previous example, such a change can occur due to a location change, a change in flight status, a change in traffic data and the like.

In yet further implementations, blocks 205 and 706 can be repeated within a given time period prior to the determined time to determine whether the determined time should be updated based on retrieving supplementary data 109 again at block 205.

It is appreciated that, in these implementations, textual information 140 can comprise calendar data associated with a calendar event. And hence supplementary contextual data 107 and context data 109 can be rendered within a reminder of the calendar event.

Figure 8:
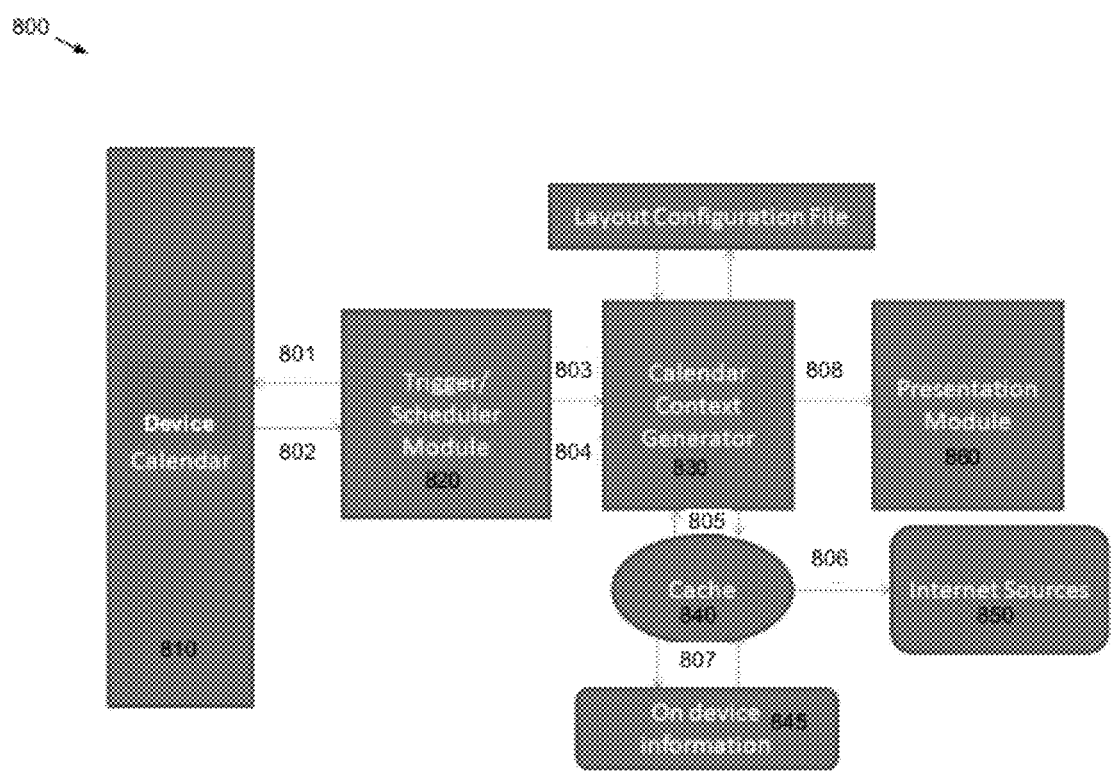
FIG. 8 depicts a hardware and software architecture for determining contextual information at a communication device, according to non-limiting implementations.

Attention is now directed to FIG. 8 which depicts a non-limiting architecture 800 for implementing method 700. Architecture 800 can comprise both software and hardware elements, as described below, and any suitable combination of elements can be combined into single software and/or hardware components.

Device Calendar 810

Device calendar 810 comprises an application for scheduling calendar event, generating calendar event, inviting attendees to calendar event, accepting calendar event, rejecting calendar event, and the like. In some implementations, device calendar 801 can comprise application 144. It is appreciated that scheduled calendar events are stored in a database, or the like, at memory 124. When a scheduled calendar event occurs device calendar 801 causes a pop up to be rendered at display device 126, the pop up comprising a reminder to show calendar details along with selectable option to open, dismiss or snooze the reminder (e.g. at a default of 15 minutes). For example, see FIGS. 9 and 10.

Trigger/Scheduler Module 820

Trigger scheduler module 820 comprises an application for scheduling calendar events a given 24 hour period (e.g. a given day). Hence, trigger/scheduler module 820 is enabled to "wake up" at 00:00 and schedule the calendar events for the next 24 hours. Trigger/scheduler module 820 also "listens" to device calendar 810 to determine when a new calendar event is added/updated or deleted for the next 24 hours to schedule it in the framework of architecture 800. Data exchanges/communication between trigger/scheduler module 820 and device calendar 810 are indicated by arrows 801, 802.

However, not all calendar events are necessarily scheduled within the framework of architecture 800. For example, trigger/scheduler module 820 can be enabled to schedule a particular calendar event only when the particular calendar event has some contextually relevant data, or around which some web services can be wrapped, otherwise it does nothing in these implementations. Examples of such services can include, but are not limited to, flight tracker information services as described above, destination weather services in case flight information is present in the particular calendar event, and, when a destination address is present in the particular calendar event, then showing the location on a map and/or estimated travel time. Trigger/schedule module 820 is enabled to schedule rendering of reminders for the calendar events at a time based on the contextual data present in the calendar events. Trigger/schedule module 820 can also be enabled to wake up around the time of trigger for rendering of a reminder to check if the scheduled time for rendering the reminder is still valid, or the time for rendering the reminder should be updated according to a change in supplementary contextual data 107; in other words, trigger/schedule module 820 causes supplementary contextual data 107 to be retrieved again at block 205 of method 700 to re-determine a time for rendering supplementary contextual data 107 in association with contextual data 109.

For example when a flight number is present in a calendar entry, then trigger/scheduler module 820 would communicate with a context generator module 830 (see below) to calculate the time at which it is most appropriate to schedule rendering of a reminder, and what is the best time to check if there is a change in supplementary contextual data 107. Calendar context generator 830, as described below, is enabled to calculate and provide trigger/scheduler module 820 the time for the trigger to happen. Data exchanges/communication between trigger/scheduler module 820 and calendar context generator 830 are indicated by arrows 803, 804.

Calendar Context Generator 830

Once trigger/scheduler module 820 asks calendar context generator 830 to determined a time to trigger rendering of a reminder of a particular calendar event, calendar context generator 830 check if contextual data 109, such as destination address, flight number, social event (place, time, event) etc., is present in particular calendar event. When contextual data 109 is present, calendar context generator 830 intelligently estimates a "best" time to cause the reminder to render the alert. For example if there is a flight number present in the particular calendar data, calendar context generator 830 first queries (arrows 805) a cache 840 to determine if flight details are present in cache 840. When the flight details are not present in cache 840 or any other on-device information resources 845 (a query to on-device resources represented by arrows 807), a web service call (arrow 806) to internet sources 850 (e.g. remote data source 103) causes the flight details to be retrieved (e.g. block 205). Calendar context generator 830 then calculates the estimate time of arrival from a present location to the airport from which the flight is scheduled to take off and approximate time spent at airport (e.g. using a default value and/or an estimate from any suitable data source). Calendar context generator 830 adds all these times to determine a time at which a user should start to travel to the airport to catch the flight. This determined time is returned back to trigger/schedule module 820 to schedule the event to trigger a rendering of a reminder of the flight at the determined time.

When the time to trigger a rendering of a reminder of a contextually relevant calendar event occurs, calendar context generator 830 contacts cache 840 to retrieve supplementary contextual data 107 and/or fetch supplementary contextual data 107 from network/internet sources 850. Layout data for the reminder can be provided in, and retrieved from, at least one screen configuration file (not depicted) stored in memory 124, and supplementary contextual data 107, along with the layout data, is passed on (arrow 808) to a presentation module 860.

Presentation Module 808

Presentation module 808 is enabled to receive the layout data from the at least one screen configuration file and supplementary contextual data 107 to be shown in the layout from calendar context generator 830 and then render a reminder of the particular calendar event by bringing a "smart calendar" view to the foreground at display device 126.

Various non-limiting examples of method 300 and method 700 are now provided.

Example 1

Figure 9:
FIGS. 9 to 15 depict renderings of textual information comprising contextual data with supplementary contextual data rendered in association with the contextual data, according to non-limiting implementations.

Attention is directed to FIG. 9 which depicts a non-limiting example of a rendering 900 of a reminder of a particular calendar event that includes location data as contextual data 109. Provided in reminder 900 are:

901: A calendar title and time and optionally a picture of the person who invited the user (not depicted).

903: Default calendar buttons to provide operations to open, close the calendar view and includes a snooze button 904 for snoozing rendering 900, described in more detail below.

905: An information section which provides the location, attendees, notes etc. In essence, the location provided in information section 905 comprises at least a portion of contextual data 109, for example the location data.

907: An estimated time of arrival based on current traffic conditions from a present location to the destination (i.e. the address provided in information section 905).

909: A total distance from a present location to the destination (i.e. the address provided in information section 905).

911: A rendering of the destination a map. In some implementations, a selection of this map (e.g. by "clicking" on the map using input device 125) can cause a map application to open (e.g. processing unit 120 processes the map application) to render a larger map providing the route from current location to the destination.

In some implementations, any email threads relevant to the calendar invite can also be rendered (not depicted).

It is appreciated that information section 905 comprises at least a portion of contextual data 109, and that rendered estimated time 907, total distance 909, and map 911 comprise supplementary data 107. Hence, rendering 900 depicts supplementary contextual data 107 rendered adjacent and proximal to contextual data 109.

It is yet further appreciated that supplementary contextual data 107 provided at rendering 900 can depend on which selectable sub-options 603'c are selected at GUI 600.

Furthermore, snooze button 904 causes rendering 900 to snooze. While in FIG. 9, snooze button 904 is depicted with a default snooze time of 5 (five) minutes, in other implementations, the snooze time interval of snooze itself can depend on method 700 in that the snooze time can depend on a determined time for rendering supplementary context data 107 in association with contextual data 109. Hence, the snooze interval can also increase or decrease based on a time to trigger rendering 900.

Example 2

Figure 10:
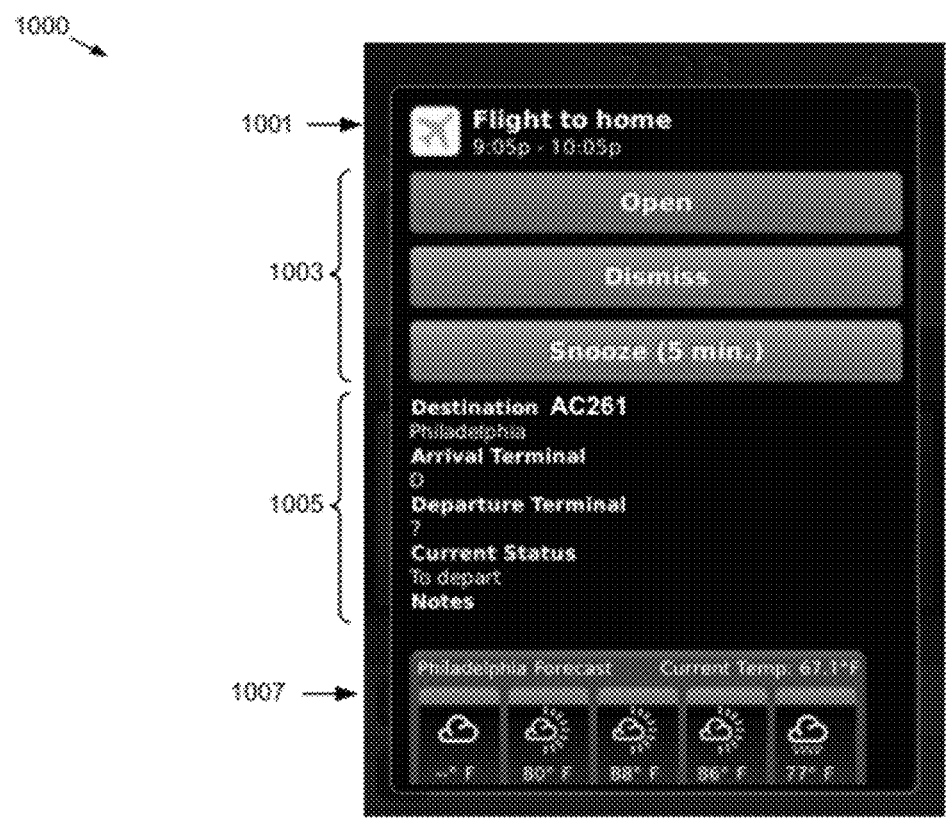

Attention is directed to FIG. 10 which depicts a non-limiting example of a rendering 1000 of a reminder of a particular calendar event that includes a flight number as contextual data 109. What is provided in reminder 1000 are:

1001: A calendar title and time, and optionally a picture/symbol of the airline providing the flight (not depicted).

1003: Default calendar buttons to provide operations to open, close or snooze the calendar view.

1005: An information section which provides flight details such as flight number departure time, gate number, current flight status etc., as well as notes, attendees etc. In these implementations, the flight number provided in information section 1005 comprises at least a portion of contextual data 109. However, it is further appreciated that information such as departure time, flight status and the like comprises at least a portion of supplementary contextual data 107 retrieved from remote data source 103.

1007: Current weather and/or weather forecast of the destination city. It is appreciated that the data in section 1007 also comprises at least a portion of supplementary contextual data 107 retrieved from remote data source 103.

Furthermore, the rendered reminder 1000 is provided at a time when a user travel to the airport to catch the flight, as described above.

It is further appreciated that given information, such as the flight number, provided in section 1005 comprises at least a portion of contextual data 109, and that at least the current flight status, and weather data provided in section 1007, comprises supplementary data 107. Hence, rendering 1000 depicts supplementary contextual data 107 rendered adjacent and proximal to contextual data 109.

It is yet further appreciated that supplementary contextual data 107 provided at rendering 1000 can depend on which selectable sub-options 603'a are selected at GUI 600.

Example 3

Figure 11:
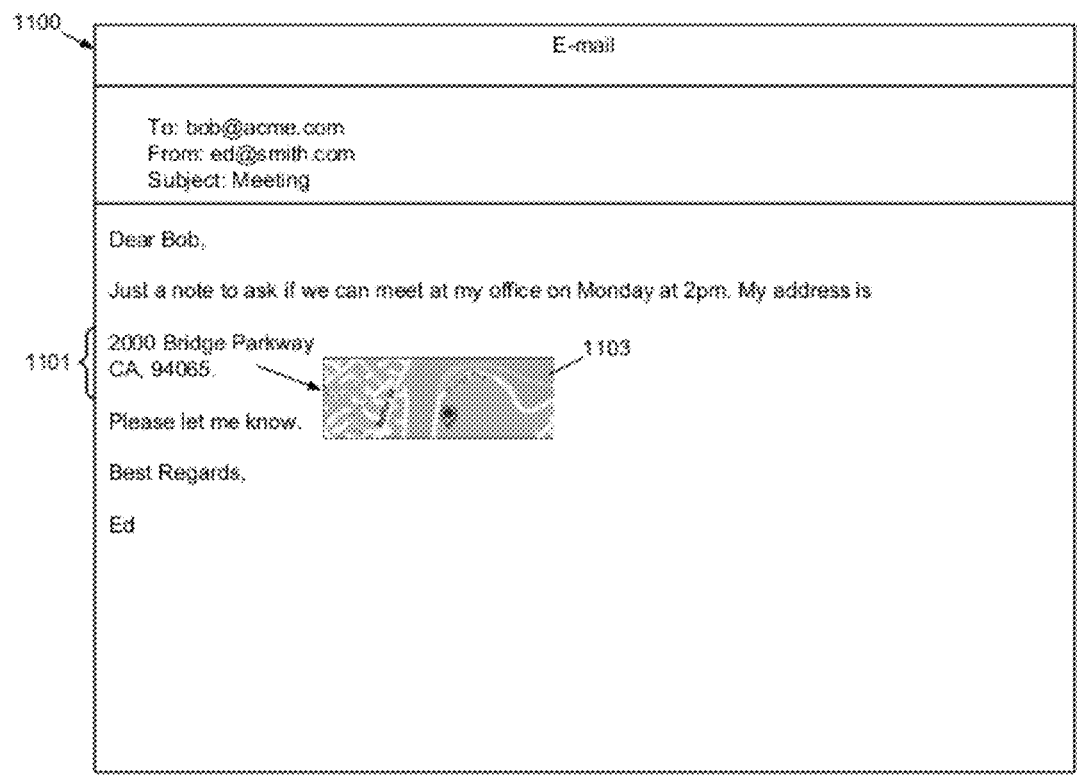

Attention is directed to FIG. 11 which depicts a non-limiting example of a rendering 1100 of an e-mail comprising location data 1101, which can be identified by the keyword "address" and/or by the format of location data 1101. When method 300 is implemented, location data 1101 is determined to be contextual data 109, extracted from textual information in the e-mail, and supplementary contextual data 107 is retrieved from remote data source 103 in form of map data providing a map of location data 1101, which is rendered as map 1103.

It is appreciated that map 1103 can be too small to be immediately useful, but that input device 125 can be used to select map 1103 and launch a map application (e.g. processing unit 120 processes the map application) to render a larger map providing further details of the location and/or a route from a current location to the location.

It is yet further appreciated that supplementary contextual data 107 provided at rendering 1100 can depend on which selectable sub-options 603'c are selected at GUI 600.

Example 4

Figure 12:
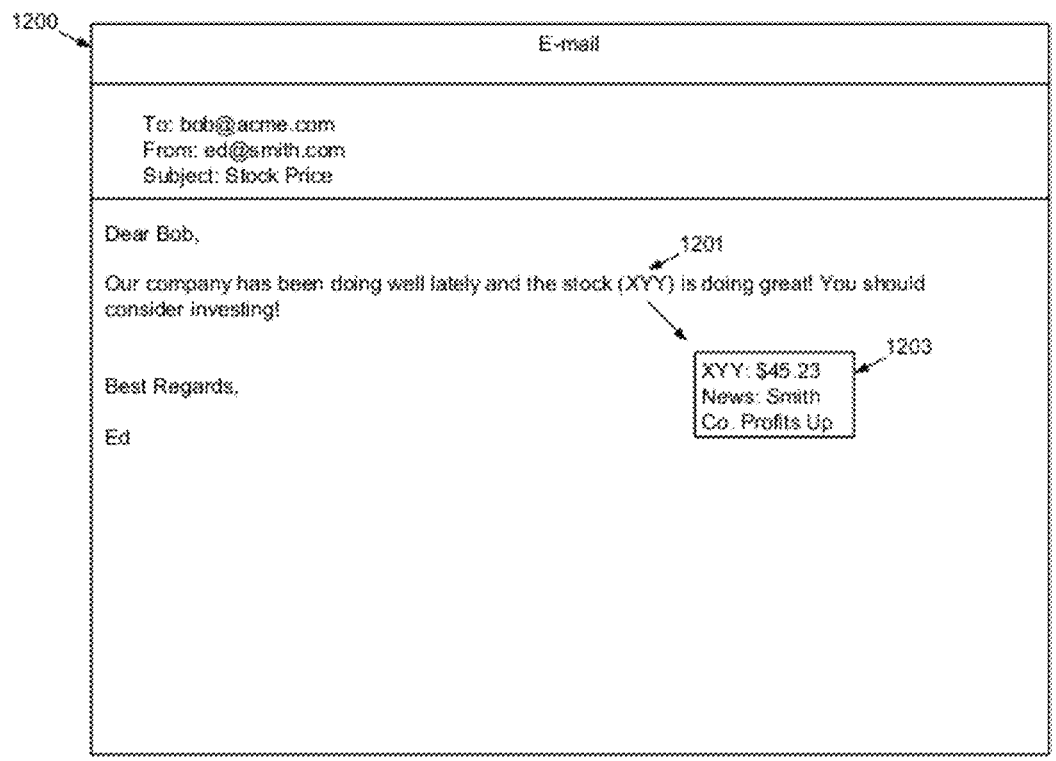

Attention is directed to FIG. 12 which depicts a non-limiting example of a rendering 1200 of an e-mail comprising stock data 1201, and specifically a stock ticker symbol, "XYY", which can be identified by the keyword ("XYY"), or by a format of the stock ticker symbol. When method 300 is implemented, stock data 1201 is determined to be contextual data 109, extracted from textual information in the e-mail, and supplementary contextual data 107 is retrieved from remote data source 103 in form of a current stock price and/or news regarding a business associated with stock data 1201, which is rendered as box 1203.

It is appreciated that box 1203 can be too small to be immediately useful, but that input device 125 can be used to select box 1203 and launch an application (e.g. processing unit 120 processes the application) to render further details of the current stock price and/or news provided in box 1203.

It is yet further appreciated that supplementary contextual data 107 provided at rendering 1100 can depend on which selectable sub-options 603'b are selected at GUI 600.

Example 5

Figure 13:
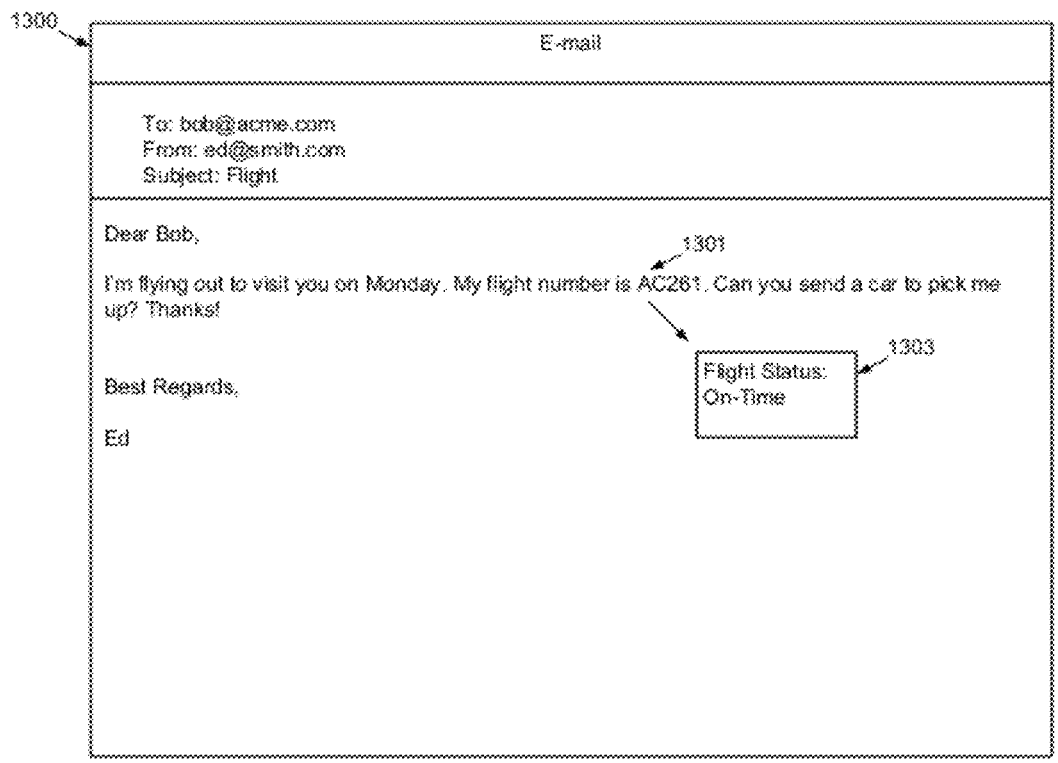

Attention is directed to FIG. 13 which depicts a non-limiting example of a rendering 1300 of an e-mail comprising a flight number 1301, and specifically text, "AC261", which can be identified by a keyword "flight number" and/or by a format of a flight number 1301. When method 300 is implemented, flight number 1301 is determined to be contextual data 109, extracted from textual information in the e-mail, and supplementary contextual data 107 is retrieved from remote data source 103 in form of a flight status, which is rendered within box 1303.

It is appreciated that box 1303 can be too small to be immediately useful, but that input device 135 can be used to select box 1303 and launch an application (e.g. processing unit 130 processes the application map application and/or a browser application) to provide further details of the flight status.

It is yet further appreciated that supplementary contextual data 107 provided at rendering 1100 can depend on which selectable sub-options 603'a are selected at GUI 600.

Example 6

Figure 14:
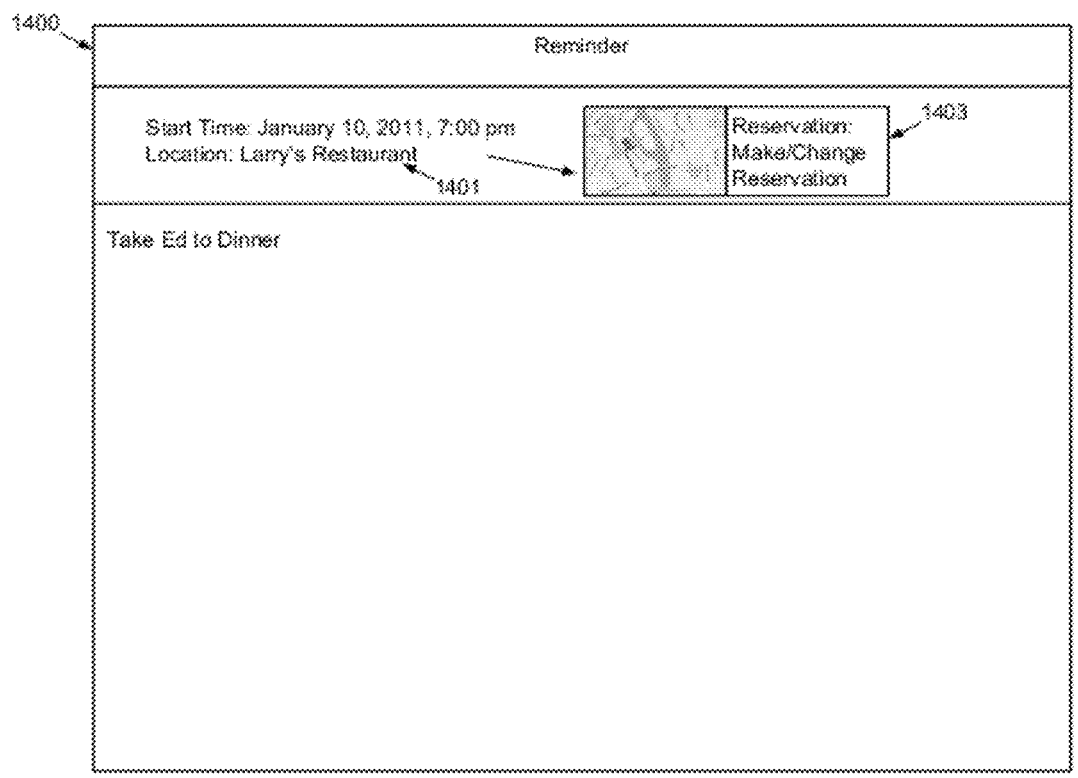

Attention is directed to FIG. 14 which depicts a non-limiting example of a rendering 1400 of a reminder comprising a restaurant name 1401, and specifically text, "Larry's Restaurant", which can be identified by a keyword "Location" and/or a keyword "Restaurant", or by a format of a restaurant name 1401. When method 300 is implemented, a restaurant name 1401 is determined to be contextual data 109, extracted from textual information in the reminder, and supplementary contextual data 107 is retrieved from remote data source 103 in form of a map and a link to website for making and/or changing a reservation, which is rendered within box 1403.

It is appreciated that box 1403 can be too small to be immediately useful, but that input device 145 can be used to select box 1403 and launch an application (e.g. processing unit 140 processes a map application and/or a browser application) to render the map in a larger format and/or further details for making and/or changing a reservation.

It is yet further appreciated that supplementary contextual data 107 provided at rendering 1100 can depend on which selectable sub-options 603'd are selected at GUI 600.

Example 7

Figure 15:
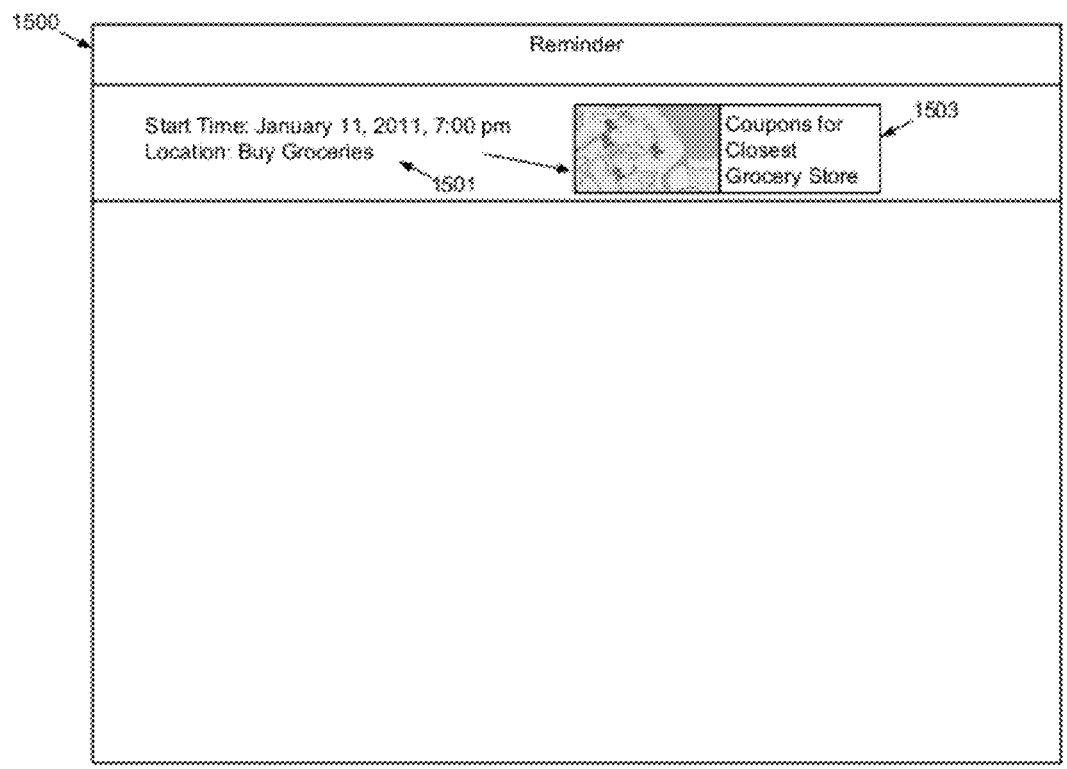

Attention is directed to FIG. 15 which depicts a non-limiting example of a rendering 1500 of a reminder for buying groceries, and specifically text 1501, "Buy Groceries", which can be identified by a keyword "Groceries", or by a format of text 1501. When method 300 is implemented, a text 1501 is determined to be contextual data 109, extracted from textual information in the reminder, and supplementary contextual data 107 is retrieved from remote data source 103 in form of a map and a link to website for providing coupons for local grocery stores (as determined from a location of device 101), which is rendered within box 1503. Alternatively, coupons for a given grocery store and/or a closest grocery store can be provided: for example, a given grocery store can pay to be given a preferred status at remote data source 103 such that coupons for the given grocery store are provided with priority. In yet further implementations, rather than provide a link, coupons for one or more grocery stores can be provided in box 1503.

It is appreciated that box 1503 can be too small to be immediately useful, but that input device 155 can be used to select box 1503 and launch an application (e.g. processing unit 150 processes a map application and/or a browser application) to render the map in a larger format and/or further details for retrieving coupons.

It is yet further appreciated that supplementary contextual data 107 provided at rendering 1100 can depend on which selectable sub-options 603'e are selected at GUI 600.

In yet further implementations, the context triggers described herein can also change the user experience of communication device 101. For example when a calendar appointment pops up which has a travel itinerary details in it, a theme of communication device 101 can be changed to a travel theme when a current time is within a given time period of a time for triggering rendering supplementary context data 107 in association with contextual data 109. For example, a shaded slideshow of photographs of destination can be provided at a home screen. Indeed, any suitable change to user experience applications can be implemented within a given time period prior to a time for rendering supplementary context data 107 in association with contextual data 109, the change based on at least one of supplementary context data 107 and contextual data 109.

While these examples are specific to contextual data comprising addresses, flight numbers, stock ticker symbols, restaurants and grocery stores, it is appreciated that any suitable contextual data, and supplementary contextual data, are within the scope of present implementations. Indeed, contextual data that provides a given context for text within which the contextual data is embedded is within the scope of present implementations. For example, suitable contextual data can be defined within the list and/or database of contextual data formats and/or keywords as described above.

Furthermore, by identifying contextual data in textual information, and rendering supplementary contextual data in association the contextual data, the supplementary contextual retrieved from a remote data source using the contextual data as a basis, the textual information can be placed into further context.

Those skilled in the art will appreciate that in some embodiments, the functionality of device 101 and remote data source 103 can be implemented using pre-programmed hardware or firmware elements (e.g., application specific integrated circuits (ASICs), electrically erasable programmable read-only memories (EEPROMs), etc.), or other related components. In other embodiments, the functionality of device 101 and remote data source 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for determining contextual information at a communication device comprising a processing unit interconnected with a memory device, a communication interface and a display device, said method comprising:
   receiving, at said processing unit, textual information from calendar data associated with a calendar event;
   processing, at said processing unit, said textual information to automatically extract contextual data embedded in said textual information in response to said receiving;
   automatically retrieving, by said processing unit, supplementary contextual data based on said contextual data from a remote data source via said communication interface in response to said processing;
   automatically rendering said supplementary contextual data at said display device in association with said calendar event from which the textual information was received and said contextual data in response to receiving said supplementary contextual data; and
   determining a time for automatically rendering said supplementary contextual data at said display device in association with said contextual data, using said supplementary context data.

2. The method of claim 1, wherein said processing said textual information to automatically extract said contextual data comprises at least one of: comparing strings in said textual information to contextual data formats; and comparing said textual information to contextual data keywords.

3. The method of claim 1, wherein said automatically retrieving said supplementary contextual data based on said contextual data from said remote data source comprises requesting said supplementary contextual data from a web service by transmitting at least a portion of said contextual data in a request to said web service.

4. The method of claim 1, wherein said automatically rendering said supplementary contextual data at said display device in association with said contextual data in response to receiving said supplementary contextual data comprises rendering said supplementary contextual data at least one of adjacent and proximal to said contextual data.

5. The method of claim 1, wherein said automatically rendering said supplementary contextual data at said display device in association with said contextual data in response to receiving said supplementary contextual data occurs at said time.

6. The method of claim 5, wherein said supplementary context data and said context data are rendered within a reminder of said calendar event.

7. The method of claim 1, further comprising changing at least one user experience application within a given time period prior to said time, said change based on at least one of said supplementary context data and said contextual data.

8. The method of claim 1, further comprising dynamically repeating said retrieving and said rendering at least one of periodically and when a change in location of said communication device is determined.

9. The method of claim 8, wherein said supplementary contextual information is updated based on said location when each of said retrieving and said rendering is repeated.

10. A communication device for determining contextual information, comprising:
   a processing unit interconnected with a memory device, a communication interface and a display device, said processing unit enabled to:
   receive textual information from calendar data associated with a calendar event;
   process said textual information to automatically extract contextual data embedded in said textual information in response to said receiving;
   automatically retrieve supplementary contextual data based on said contextual data from a remote data source via said communication interface in response to said processing; and,
   automatically render said supplementary contextual data at said display device in association with said calendar event from which the textual information was received and said contextual data in response to receiving said supplementary contextual data; and
   determine a time for automatically rendering said supplementary contextual data at said display device in association with said contextual data, using said supplementary context data.

11. The communication device of claim 10, wherein said processing unit is further enabled to process said textual information to automatically extract said contextual data by at least one of: comparing strings in said textual information to contextual data formats; and comparing said textual information to contextual data keywords.

12. The communication device of claim 10, wherein said processing unit is further enabled to automatically retrieve said supplementary contextual data based on said contextual data from said remote data source by requesting said supplementary contextual data from a web service by transmitting at least a portion of said contextual data in a request to said web service.

13. The communication device of claim 10, wherein said processing unit is further enabled to automatically render said supplementary contextual data at said display device in association with said contextual data in response to receiving said supplementary contextual data by rendering said supplementary contextual data at least one of adjacent and proximal to said contextual data.

14. The communication device of claim 10, wherein said processing unit is further enabled to automatically render said supplementary contextual data at said display device in association with said contextual data, in response to receiving said supplementary contextual data, at said time.

15. The communication device of claim 14, wherein said supplementary context data and said context data are rendered within a reminder of said calendar event.

16. The communication device of claim 10, wherein said processing unit is further enabled to change at least one user experience application within a given time period prior to said time, said change based on at least one of said supplementary context data and said contextual data.

17. The communication device of claim 10, wherein said processing unit is further enabled to dynamically repeat said retrieve step and said render step at least one of periodically and when a change in location of said communication device is determined.

18. The communication device of claim 17, wherein said supplementary contextual information is updated based on said location when each of retrieve step and said render step is repeated.

19. A non-transitory computer program product, comprising a computer usable medium having a computer readable program code adapted to be executed to implement a method for determining contextual information at a communication device comprising a processing unit interconnected with a memory device, a communication interface and a display device, said method comprising:

receiving textual information from calendar data associated with a calendar event;

processing said textual information to automatically extract contextual data embedded in said textual information in response to said receiving;

automatically retrieving supplementary contextual data based on said contextual data from a remote data source via said communication interface in response to said processing;

automatically rendering said supplementary contextual data at said display device in association with said calendar event from which the textual information was received and said contextual data in response to receiving said supplementary contextual data; and determining a time for automatically rendering said supplementary contextual data at said display device in association with said contextual data, using said supplementary context data.

20. A method for determining contextual information at a communication device comprising a processing unit interconnected with a memory device, a communication interface and a display device, said method comprising:

receiving, at said processing unit, textual information from calendar data associated with a calendar event;

processing, at said processing unit, said textual information to automatically extract contextual data embedded in said textual information in response to said receiving;

automatically retrieving, by said processing unit, supplementary contextual data based on said contextual data from a remote data source via said communication interface in response to said processing by requesting said supplementary contextual data from a web service, said requesting comprising transmitting at least a portion of said contextual data in a request to said web service;

automatically rendering said supplementary contextual data at said display device in association with said calendar event from which the textual information was received and said contextual data in response to receiving said supplementary contextual data;

determining a time for automatically rendering said supplementary contextual data at said display device in association with said contextual data, using said supplementary context data; and dynamically repeating said retrieving and said rendering at least one of periodically and when a change in location of said communication device is determined.

* * * * *